(12) United States Patent
Yang

(10) Patent No.: US 8,920,176 B1
(45) Date of Patent: Dec. 30, 2014

(54) TRAINING SYSTEM FOR CARDIAC COMPUTED TOMOGRAPHY ANGIOGRAPHY

(76) Inventor: Clifford K. Yang, Farmington, CT (US)

(*) Notice: Subject to any disclaimer, the term of this patent is extended or adjusted under 35 U.S.C. 154(b) by 196 days.

(21) Appl. No.: 13/455,382

(22) Filed: Apr. 25, 2012

Related U.S. Application Data

(60) Provisional application No. 61/518,113, filed on Apr. 29, 2011.

(51) Int. Cl.
*G09B 23/28* (2006.01)
(52) U.S. Cl.
USPC ............. 434/272; 434/262; 434/267; 623/3.1
(58) Field of Classification Search
USPC .................................... 434/267, 272; 623/3.1
See application file for complete search history.

(56) References Cited

U.S. PATENT DOCUMENTS

| | | | |
|---|---|---|---|
| 5,052,934 A | 10/1991 | Carey et al. | |
| 6,062,866 A * | 5/2000 | Prom | 434/268 |
| 6,234,804 B1 * | 5/2001 | Yong | 434/267 |
| 6,629,469 B2 | 10/2003 | Jaszczak et al. | |
| 6,843,145 B2 | 1/2005 | Jaszczak et al. | |
| 8,808,004 B2 * | 8/2014 | Misawa et al. | 434/268 |
| 2003/0045803 A1 | 3/2003 | Acharya | |
| 2007/0054256 A1 * | 3/2007 | Low et al. | 434/268 |
| 2009/0068627 A1 * | 3/2009 | Toly | 434/267 |
| 2009/0226867 A1 * | 9/2009 | Kalafut et al. | 434/268 |
| 2010/0167251 A1 | 7/2010 | Boutchko et al. | |
| 2011/0104651 A1 * | 5/2011 | Sweeney | 434/268 |
| 2011/0117531 A1 * | 5/2011 | Iwasaki et al. | 434/272 |

OTHER PUBLICATIONS

Boltz et al., "An anthropomorphic beating heart phantom for cardiac X-ray CT imaging evaluation", Journal of Applied Clinical Medical Physics, Winter 2010, pp. 191-199, vol. 11.

* cited by examiner

*Primary Examiner* — Xuan Thai
*Assistant Examiner* — Banafsheh Hadizonooz
(74) *Attorney, Agent, or Firm* — Deborah A. Basile; Karen K. Chadwell

(57) ABSTRACT

A training system comprising a phantom heart, the phantom heart comprising an exterior surface upon which a tubing is topologically arranged in a manner which mimics the placement of the distal LCx, the LAD, the PDA, and the RCA. The tubing is configured to receive a contrast agent received from a power injector. The training system further comprises an airway subsystem which is modeled to represent the trachea, the right bronchus, and the left bronchus, and which is arranged relative to the phantom heart such that a portion of the airway subsystem which approximates the position of the tracheal carina is aligned with a portion of the phantom heart that represents the ascending aorta. The training system further comprises an EKG pulse generator in electrical communication with a computed tomography scanner for purposes of conducting computed tomography angiography of the phantom heart.

7 Claims, 8 Drawing Sheets

TRAINING SYSTEM FOR CARDIAC COMPUTED TOMOGRAPHY ANGIOGRAPHY

CROSS REFERENCE TO RELATED APPLICATIONS

This application claims the benefit of U.S. Provisional Application No. 61/518,113 filed on Apr. 29, 2011.

BACKGROUND TO THE INVENTION

1. Field of the Invention

This invention relates generally to a medical imaging phantom, and, more particularly, to a training system comprising a phantom heart, wherein, in an exemplary embodiment, the system is used for training related to cardiac computed tomography angiography.

2. Background of the Invention

The following information is provided to assist the reader in understanding the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein is incorporated by reference.

Computed tomography (CT) is a medical imaging technique in which digital geometry processing is used to generate a three-dimensional imaging of a region of interest within a body from a series of two-dimensional X-ray images taken around a single axis of rotation. A contrast medium injected into a patient's venous system is typically used to enhance the contrast of various structures and/or fluids within the region of interest. The development of multi-slice CT ("MSCT") (for example, up to 64-slice) has provided both high resolution and high speed. Moreover, images with even higher temporal resolution can be generated using electrocardiogram ("EKG") gating to correlate CT data with corresponding phases of cardiac contraction.

As MSCT enables the acquisition of sub-millimeter slices and near isotropic voxels, anatomical territories previously unacquirable are now almost routinely imaged. In particular, dynamic structures such as the coronary vasculature, are able to be imaged as a result of the MSCT scanner's ability to acquire a volumetric data set in 5-20 seconds, well within the breath-hold interval of most patients. Furthermore, the latest generation of MSCT also enables cardiac CT even in the presence of high heart-rates and arrhythmia. Cardiac CT angiography is therefore a demanding imaging regime in which the clinician must perfect his technique to maximize image quality.

Intrinsic to the quality of a cardiac CT angiography exam is the proper dosing, delivery, and timing of the iodinated contrast bolus required for image contrast enhancement. Because cardiac CT angiography is only concerned with arterial imagery during the first-pass of the contrast bolus, the timing of the scanner acquisition relative to the peak contrast enhancement in the cardiac anatomy is important. In the case of cardiac. CT angiography with MSCT scanners, the optimization and timing of the contrast bolus is crucial.

The widespread clinical adoption of multi-slice CT has lead to challenges in adapting imaging and contrast delivery techniques which were developed in connection with single-slice, helical CT scanners. Development of optimal contrast injection techniques to generate ideal contrast enhancement has been the subject of numerous CT studies. The outcomes of such studies, however, are often not comparable and interpretation controversy arises because of variations in injection technique, parameters, and contrast medium properties. A consensus for optimal injection parameters and choice of contrast media for intravenous contrast enhancement in CT-scanning has yet to be reached and further investigation is ongoing and mandatory as scanning technology advances. To best compare different injection protocols, hemodynamic values like blood pressure, blood volume and cardiac output should ideally be held constant, as these factors significantly influence contrast enhancement. With non-uniform distribution of these factors, comparison of the contrast application is difficult to assess. Furthermore, measurements of time-enhancement curves at defined anatomic sites are required to ensure an exact analysis of contrast enhancement. To obtain a time-enhancement curve, serial CT scans at one anatomic level are necessary. However, such serial scans are not feasible in a patient study as a result of the increased radiation burden of the long acquisition time.

In an attempt to avoid the increased radiation burden and expense associated with CT patient studies, use of a flow phantom to simulate or emulate convective transport properties of the cardiovascular system has been studied. Repeated injections of a contrast agent demonstrated some utility of the model in replicating the contrast enhancement pattern of the abdominal aorta in MSCT. Although utility was demonstrated for such a flow phantom, a number of significant limitations hinder the use of the flow phantom in developing improved CT injection protocols for contrast media.

It is, therefore, desirable to develop improved cardiovascular flow phantoms, models or systems for use in studies of the propagation of injectable fluids, including, for example, contrast media and/or other drugs.

SUMMARY OF THE INVENTION

Disclosed herein is a cardiac computed tomography ("CT") angiography training system which comprises a phantom heart which is modeled after the human heart. The system is to designed such that the phantom heart models the anatomic, electrical, and mechanical features of an actual human heart so that CT technologists/technicians, physicians and other clinical professionals may learn and master cardiac CT angiography procedures before carrying out imaging methods with actual patients.

Use of the training system improves the preparation and practical skills of CT angiography professionals. An advantage of the disclosed invention is to lower patient exposure to unnecessary radiation and intravenous ("IV") contrast agents that could occur in poorly performed CT angiography exams, for example, those exams that take an excessive amount of time. In most circumstances, it is not appropriate or ethical to allow CT angiography training to be performed with volunteer human subjects because of the need to use radiation. CT angiography training also involves the use of IV contrast agents, which also have some potential risks to human volunteers.

Disclosed herein is a cardiac CT angiography phantom that models coronary artery calcium, the coronary arteries, cardiac motion and, optionally cardiac electrical activity.

Disclosed herein are exemplary materials and methods for fabricating a CT angiography phantom at reasonable cost. In one embodiment the CT angiography phantom is constructed using readily available materials.

It is a further object of the invention to be used in determining appropriate doses of radiation and/or contrast agents prior to actual CT angiography procedures.

DETAILED DESCRIPTION OF THE INVENTION

Figure 9:
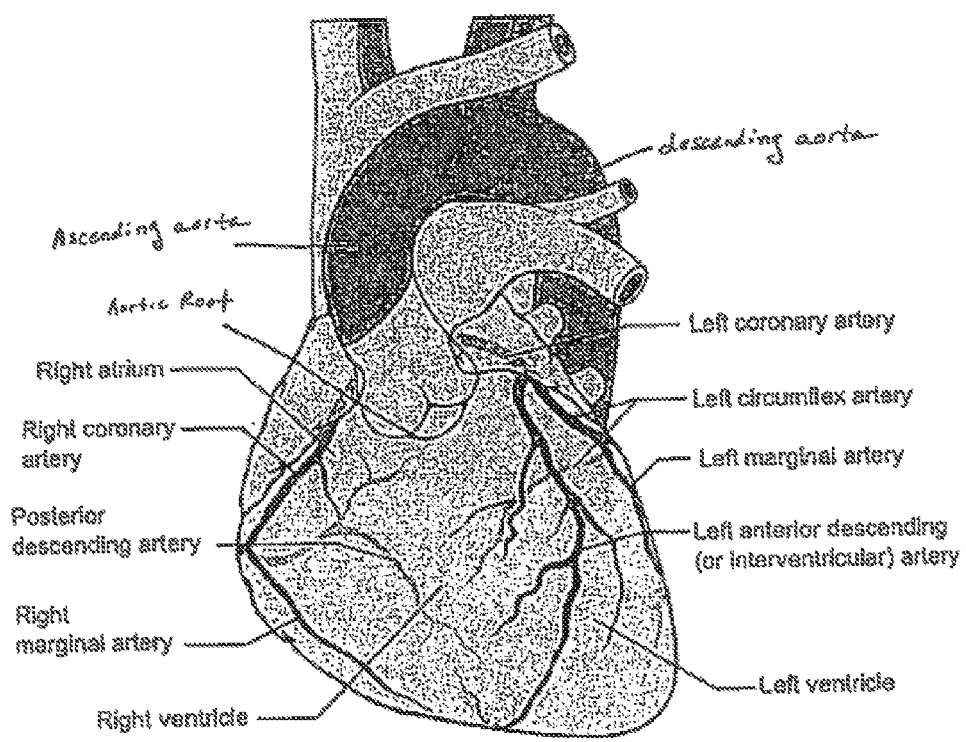
FIG. 9 is an illustration depicting an actual human heart along with the distal left circumflex artery, the left anterior descending artery, the posterior descending artery, the right coronary artery, and the aorta.

The training system of the present invention comprises a phantom heart, which models an actual human heart along with the placement of certain selected coronary arteries thereon (see FIG. 9), wherein the phantom heart is constructed to assist a user in performing cardiac CT angiography. To that end, the phantom heart comprises an exterior surface which represents the myocardium, and tubing which is topologically arranged on an exterior surface of the exterior surface to model the approximate location of certain select arteries of the human heart. In an exemplary embodiment, the tubing is continuously arranged on the exterior surface such that the tubing is disposed on a portion of the exterior surface that represents the distal left circumflex artery (the "LCx"). The tubing then moves towards an anterior portion of the exterior surface which represents an approximate position of the aortic root. From this anterior portion, the tubing loops away from the anterior portion and runs towards a portion of the exterior surface which represents the approximate location of the left anterior descending artery ("LAD"). The tubing then moves towards a posterior region of the exterior surface, wherein the posterior region models the approximate position of the heart apex. The tubing then wraps under the posterior region where it runs onto a back side of the exterior surface up to a region of the exterior surface that approximates the position of the posterior descending artery (the "PDA"). From this position, the tubing then bends and moves towards a proximal lateral side of the exterior surface upon which it then runs over the proximal lateral side and then runs onto the front side of the exterior surface at a position of the exterior surface that approximates the position of the right coronary artery ("RCA"). The tubing then extends away from the exterior surface to model the position of the ascending and descending aorta.

The tubing of the phantom heart is selected to carry a contrast agent which may be used to perforin cardiac CT angiography. An exemplary contrast agent includes an iodixanol radiopaque such as, for example, Visipaque 350. In an exemplary embodiment, the contrast agent is introduced into a proximal end of the tubing via a CT power injector, and exits a distal end of the tubing.

In an exemplary embodiment, the training system further allows for the detection of coronary atherosclerotic disease ("CAD") via the use of CAD mimicking members, wherein such members assist in calcium scoring. In an exemplary embodiment, a CAD mimicking member is disposed on and/or within the tubing, wherein, in an especially preferred embodiment, the CAD mimicking member is disposed on and/or within the portion of the tubing that models the approximate position of at least one of the LAD, the LCx, and the RCA relative to the exterior surface of the phantom heart, wherein placement on the portion of the tubing that models the approximate position of the LAD is especially preferred. Furthermore, in an exemplary embodiment, the CAD mimicking member comprises crushed calcium carbonate tablets having a diameter of up to the approximate inner diameter of the inner diameter of the tubing, wherein such crushed calcium carbonate may be glued onto the tubing.

The training system further comprises an airway subsystem which is designed to model the general shape of the human trachea, right bronchus, and left bronchus, and which is positioned relative to the phantom heart in a manner that closely approximates such position in the human body. In an especially preferred embodiment, the airway subsystem is positioned relative to the phantom heart such that a tracheal carina portion of the airway subsystem, i.e., that portion of the airway subsystem in which the trachea meets the left and right bronchi, is aligned with a portion of the phantom heart that represents the ascending aorta.

In an exemplary embodiment, the members which model the trachea, the right bronchus, and the left bronchus comprise a generally cylindrical configuration having a lumen or hollow interior formed therethrough, wherein a density of the lumen is substantially similar to the density of air. Additionally, in an exemplary embodiment, the airway subsystem is preferably formed such that the members forming the trachea, right bronchus, and left bronchus comprise a density substantially similar to the density of soft tissue. Furthermore, in an exemplary embodiment, the member which models the trachea preferably has a length of about 5 centimeters and a thickness of about 1 to about 2 centimeters, while the members that model the left and right bronchus preferably have a length of about 12 centimeters and a thickness of about 1 to about 2 centimeters. Furthermore, in an exemplary embodiment, the members that model the trachea and the left and right bronchi have a generally cylindrical shape having an outer diameter of about 2 centimeters. In an especially preferred embodiment, the trachea and the right and left bronchi each comprise a cardboard roll.

The training system further comprises an EKG pulse generator and a CT scanner, wherein the EKG pulse generator and the CT scanner are in electrical communication with one another. In an exemplary embodiment, the EKG pulse generator generates electrical outputs that correspond to electrical outputs generated in EKG readings performed on an actual person wherein an electrical output is typically generated for leads attached to the person's left arm, left leg, right arm, and right leg. The electrical outputs are transmitted from the EKG pulse generator to the CT scanner.

In an exemplary embodiment, the body of the phantom heart comprises a material capable of deflation and inflation such that the phantom heart mimics the human heart's systole and diastole movement. In such an embodiment, the training system further comprises a fluid source which is in communication with the phantom heart, and the phantom heart comprises one or more ports whereby fluid originating from the fluid source enters and exits an interior of the phantom heart. In this manner, then, the training system mimics the mechanical movement of a human heart. In an exemplary embodiment, the fluid comprises compressed oxygen. In this embodiment, the training system may further comprise a valve which controls the egress and ingress of the fluid from and into the phantom heart's body. The valve may in turn be controlled by the EKG pulse generator to thereby time the retraction and contraction of the phantom heart with a desired sign wave or electrical impulse created by the EKG pulse generator. In this manner, then, the training system mimics the electrical, mechanical, and anatomical features of the human heart.

The invention shall now be more specifically described with reference to the drawings, wherein it is to be understood that the invention is not limited to the particular embodiments disclosed herein, but is to include modifications and variations thereto as would occur naturally upon a reading of the present disclosure.

Figure 1:
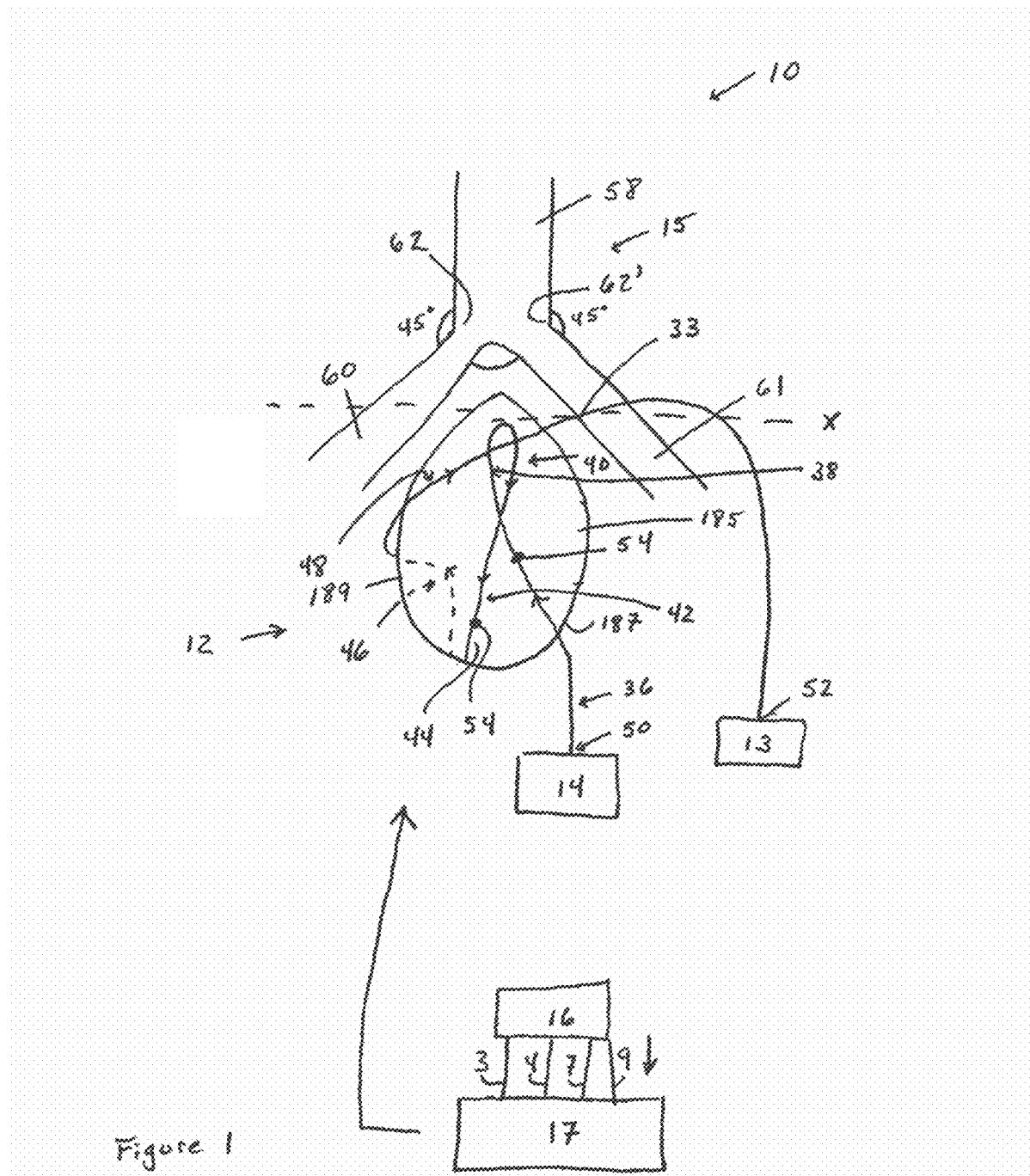
FIG. 1 is a schematic depicting an exemplary training system.
Figures 2, 3:
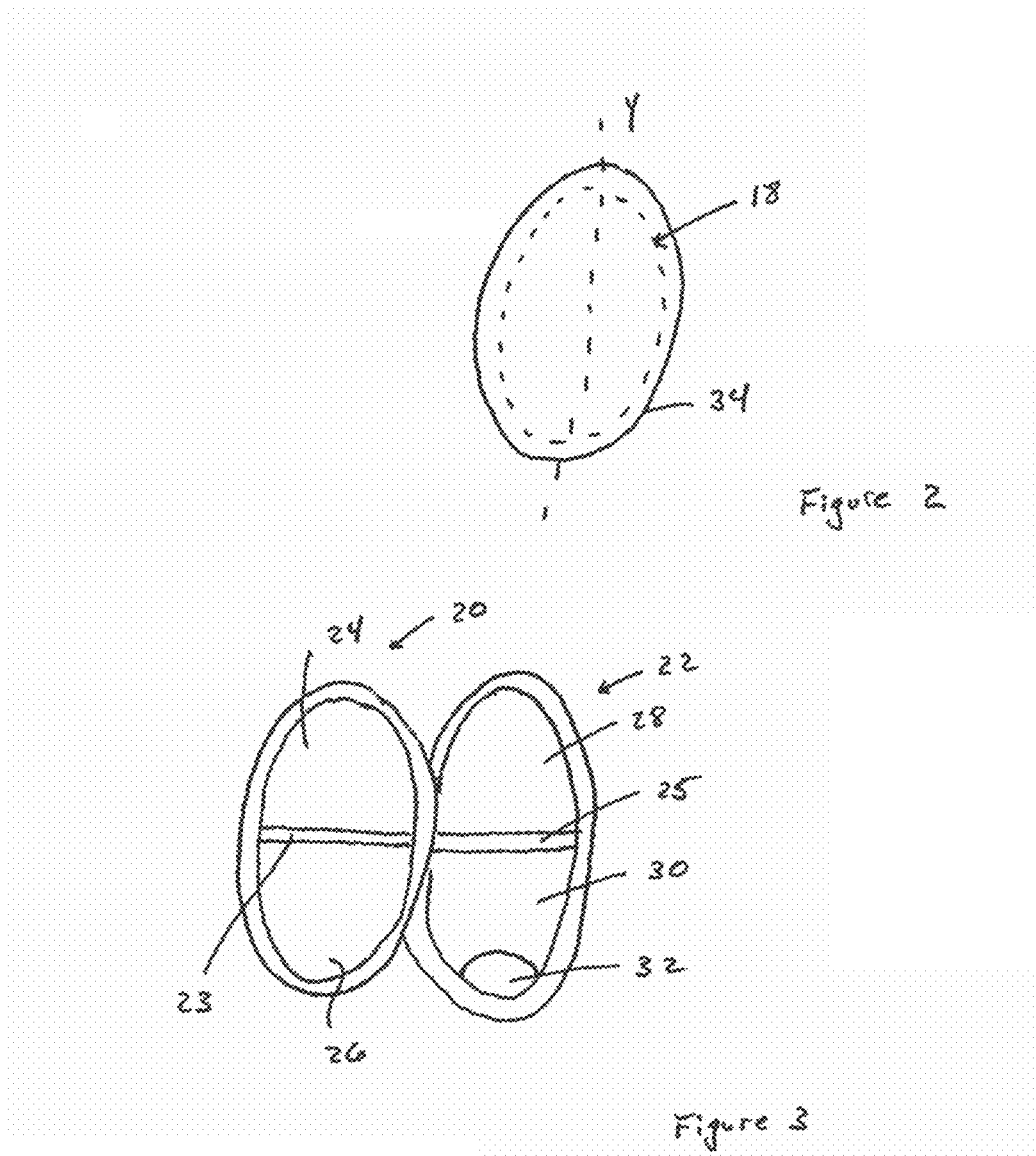
FIG. 2 is a schematic depicting an exterior side of an exemplary phantom heart without the arterial tubing.
FIG. 3 is a schematic depicting a longitudinal section of an interior of the phantom heart depicted in FIG. 2.

An exemplary embodiment of a training system 10 is depicted in FIGS. 1-3, wherein training system 10 is ideally suited for imaging coronary calcium, performing a timing bolus with a contrast agent, and obtaining a cardiac CT angiography after the contrast agent has been injected. Referring to FIGS. 1-3, training system 10 comprises a phantom heart 12, a CT power injector 14, an EKG pulse generator 16, an airway subsystem 15, and a CT scanner 17. In an exemplary embodiment, phantom heart 12 is physically connected to CT power injector 14, EKG pulse generator 16 is physically and electrically connected to CT scanner 17, and CT scanner 17 is in electrical communication with phantom heart 12.

Phantom heart 12 comprises a substantially hollow oval-shaped body 18, which is bisected along a longitudinal axis y into a first half 20 and a second half 22. In an exemplary embodiment, body 18 comprises a plastic material. Each of first half 20 and second half 22 are divided crosswise by a respective divider 23 and 25 to respectively form a right atrium 24 situated above a right ventricle 26 and a left atrium 28 situated above a left ventricle 30. Dividers 23 and 25, each of which may comprise paper tape, respectively model the tricuspid valve and the mitral valve. Left ventricle 30 further has disposed therein a thrombus-mimicking member 32, wherein, in an exemplary embodiment, thrombus-mimicking member 32 comprises a diameter of about 1 centimeter and/or comprises a density of greater than about 130 Hounsfield Units. In an especially preferred embodiment, thrombus-mimicking member 32 comprises a ball of clay, such as play dough, such as is manufactured by Crayola®.

Phantom heart 12 further comprises an overlay 34 which envelops body 18, wherein overlay comprises a top side 185 opposite to a back side 187. Overlay 34, which models myocardium, may have a density of about 0 to about 350 Hounsfield Units, wherein a density of about 0-about 20 Hounsfield Units is especially preferred as such density is substantially similar to the density of soft tissue. Additionally, once overlay 34 is positioned over body 18, it preferably has a thickness of about 7 millimeters to about 11 millimeters, wherein such a thickness substantially mimics the thickness of the human heart left ventricle wall.

Additionally, phantom heart 12 comprises arterial tubing 36 which is positioned on overlay 34 to mimic the approximate location of the LCx, the left anterior descending artery LAD, the posterior descending artery, and the right coronary artery RCA. More particularly and referring to FIG. 1, arterial tubing 36, which preferably comprises an IV tubing having an inner diameter of about ⅛ inch and an outer diameter of about ¼ inch, is positioned on a portion 38 of overlay 34 that approximates the position of the LCx in the typical human heart. Arterial tubing 36 then extends from portion 38 and runs towards an anterior portion 40 of overlay 34, wherein anterior portion 40 models an approximate position of the aortic root in the typical human heart. From this position, arterial tubing 36 loops oppositely away from anterior portion 40, and extends along overlay 34 to a portion 42 of overlay 34 that approximates the location of the LAD in the typical human heart. Arterial tubing 36 then runs from portion 42 to a posterior region 44 of overlay 34, wherein posterior region 44 models the approximate position of the heart apex in the typical human heart. From posterior region 44, arterial tubing 36 runs under posterior region 44 and then runs on back side 187 of overlay 34 towards the aortic root, where it extends up to a portion 46 of overlay 34 that approximates the location of the PDA in the typical human heart. Arterial tubing 36 then turns laterally from portion 46 towards a proximal lateral side 189 of overlay 34, wraps back around to front side 185, and extends to a portion 48 of overlay 34 which approximates a location of the RCA in the typical human heart. Arterial tubing 36 then moves away from overlay 34 where it becomes representative of the ascending aorta and the descending thoracic aorta. Prior to its placement on portion 38, arterial tubing 36 comprises a proximal end 50 that is joined to CT power injector 14. A distal end 52 of arterial tubing 36, which is oppositely situated from proximal end 50, is preferably disposed within a catch basin 13, such as a urinal, wherein catch basin 13 catches a contrast agent which is provided by CT power injector 14, as such contrast agent is discharged from distal end 52 of arterial tubing 36.

Phantom heart 12 also comprises one or more calcium carbonate deposits 54, each of which is disposed on an exterior surface of arterial tubing 36.

Airway subsystem 15 comprises a generally inverted Y-shaped body 56, wherein a vertically extending member 58 of body 56 represents a human trachea; a member 60, which extends from a proximal lateral terminal end 62 of body 56 at an angle of about 45 degrees therefrom, represents a human right bronchus; and a member 61, which extends from a distal lateral terminal end 62' of body 104 at an angle of about 45 degrees therefrom, represents a human left bronchus. Members 60 and 61 form an approximate angle of about 90 degrees relative to each other. Members 58, 60, and 61 comprise a generally cylindrical shape, and, in an exemplary embodiment, are formed from cardboard rolls. In an exemplary embodiment, phantom heart 12 is positioned relative to airway subsystem 15 such that body 18 and overlay 34 are positioned between members 60 and 61, and such that the portion of tubing 36 which represents the ascending aorta is positioned over members 60 and 61 at an approximate position of where the tracheal carina would be positioned in an actual human (wherein the approximate position of the tracheal carina is shown by a dashed line labeled as "X" in FIG. 1).

In an exemplary method of use of training system 10, CT power injector 14 is connected to proximal end 50 of arterial tubing 36. A clamp (not shown) may be positioned on proximal end 50 to prevent back flow if the proximal connection is a side port. Distal end 52 of arterial tubing 36 is positioned within catch basin 13. EKG pulse generator 16 is connected to CT scanner 17, which, in an exemplary embodiment, comprises a 64 slice CT scanner, via conventional means, i.e., a white lead (representative of the right arm), a black lead (representative of the left arm), a red lead (representative of the left leg), and a green lead (representative of the right leg), respectively labeled as 3, 4, 7, and 9 in FIG. 1, are connected to the corresponding lead colors on EKG pulse generator 16. CT scanner 17, in turn, is in electrical communication with phantom heart 12.

A scout topogram of phantom heart 12 may then be performed. During a signal from EKG pulse generator 16, CT power injector 14 pushes the contrast agent through arterial tubing 36. CT scanner 17, which is in electrical communication with phantom heart 12, then takes an image of phantom heart 12.

A calcium score utilizing training system 10 may also be performed. In an exemplary embodiment, the calcium score is set up in any conventionally known manner, e.g., 1 centimeter below the tracheal carina to just below the inferior border of the heart, e.g., at an approximate location of portion 44 of overlay 34. The calcium score may be taken at a 3 millimeter slice thickness at about 120 kilovolts peak.

In addition to scoring calcium, training system 10 is also well suited to perform a timing bolus. In an exemplary embodiment, an axial slice through a portion 33 of arterial tubing 36, wherein portion 33 represents the ascending aorta, may be obtained by running about 24 milliliters of a contrast agent, such as, for example, an iodixanol radiopaque contrast agent such as Visipaque 350, through arterial tubing 36 at about 6 milliliters per second with about a 60 milliliter normal saline flush.

A cardiac CT angiography may also be performed by running about 120 milliliters of a contrast agent, such as, for example, Visipaque 350, at about 6 milliliters per second with about 60 milliliters normal saline flush. The calcium score images, cardiac CT angiography images, 3-D reformatted phantom heart images, and a DLP radiation sheet may be sent to a picture archival system.

Although training system 10 is a useful imaging acquisition model for calcium scoring and for cardiac CT angiography imaging which includes the use of a timing bolus, training system 10 may not be useful for a functional analysis as it has no moving parts. Accordingly, other exemplary embodiments shall now be described, wherein such embodiments serve to represent cardiac motion and to synchronize the motion with EKG generated electrical impulses.

Figure 4:
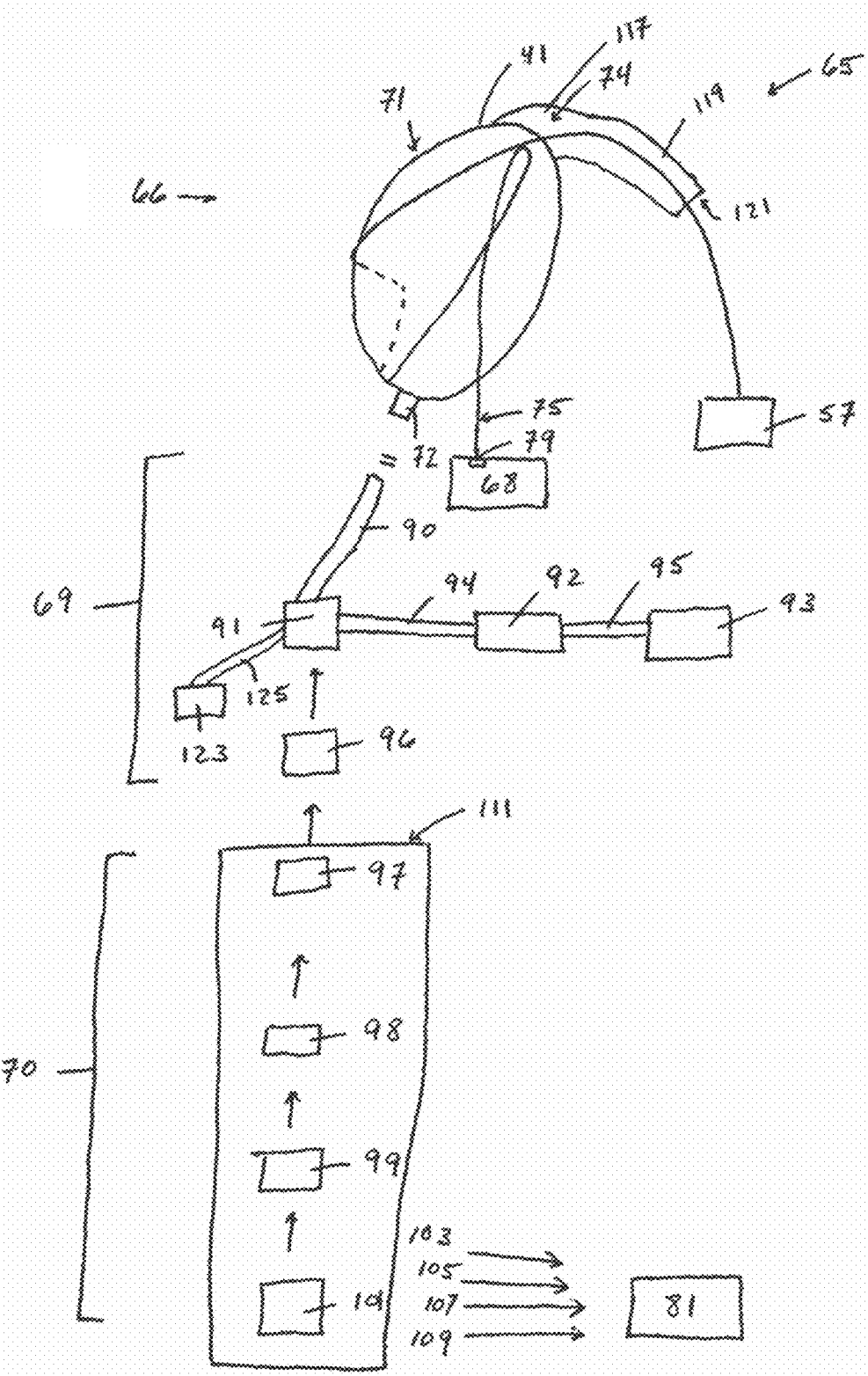
FIG. 4 is a schematic depicting another exemplary training system.
Figure 5:
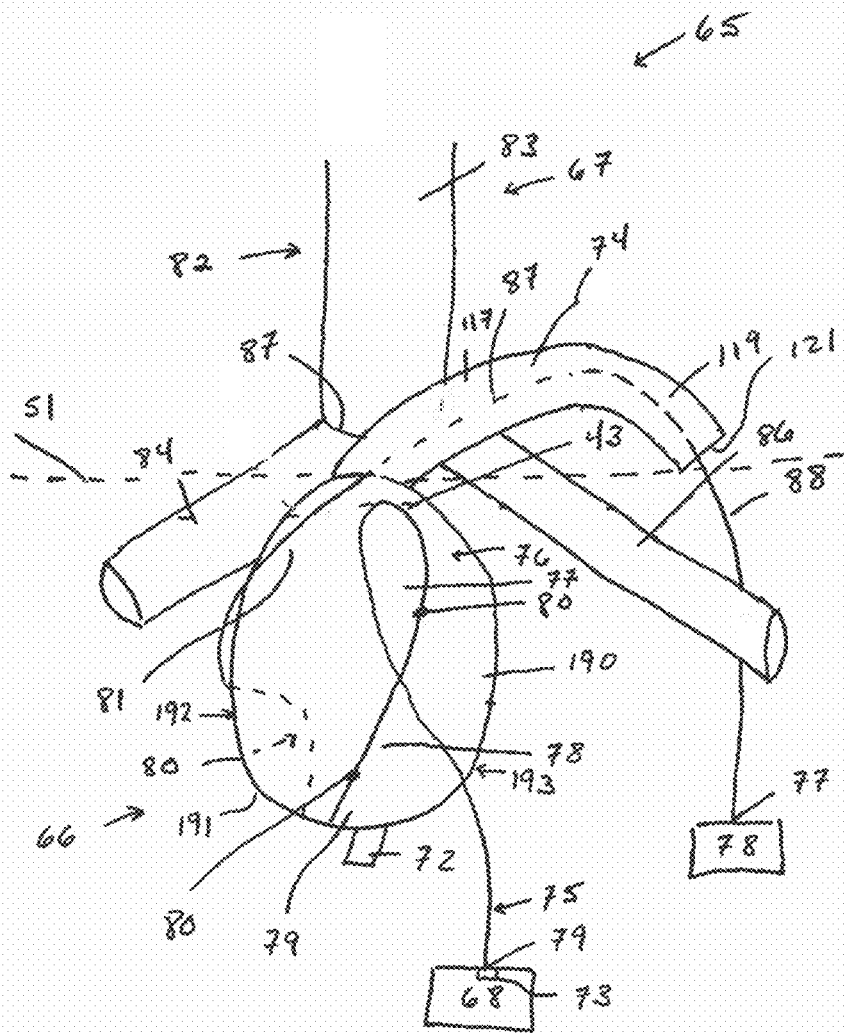
FIG. 5 is a schematic depicting a partial view of the training system depicted in FIG. 4.

FIGS. 4 and 5 refer to a training system 65 comprising a phantom heart 66, an airway subsystem 67, a CT power injector 68, a fluid source subsystem 69, an EKG pulse generator 70, and a CT scanner 81. As will be made more clear below, training system 65 models coronary artery calcium, human coronary arteries, and human cardiac motion.

Phantom heart 66 comprises an expandable body 71. Expandable body 71, which comprises a generally oval-shaped geometry, comprises a front side 190 opposite to a back side 191, and a proximal lateral side 192 opposite to a distal lateral side 193, wherein front side 190, back side 191, proximal lateral side 192, and distal lateral side 193 surround a hollow interior. Expandable body 71 comprises an air port 72 which leads into the hollow interior of body 71. In a preferred embodiment, the hollow interior has a 500 milliliter capacity. An exemplary body 71 may be selected from any one of a wide variety of conventionally known test lungs, such as, for example, those manufactured by Bay Medical and Puritan-Bennett Corporation (Model #0612).

Phantom heart 66 further comprises an aorta-representing member 74 which is disposed on a top side 41 of body 71 and which extends therefrom to represent the ascending aorta at a portion 117 thereof and the descending thoracic aorta at a portion 119 thereof. Additionally, member 74 comprises a hollow interior 121. In a preferred embodiment, member 74 is formed to model the human aorta, and, therefore, preferably comprises a diameter of about 2 centimeters to about 3 centimeters, and has a density of about 0 to about 350 Hounsfield Units, wherein a density of about 0 to about 20 Hounsfield Units is especially preferred, wherein such a density models soft tissue density. In the embodiment depicted in FIGS. 4 and 5, member 74 comprises day, such as, play dough manufactured by Crayola®.

Phantom heart 66 further comprises arterial tubing 75 which is topologically disposed on an exterior surface 76 of body 71 to sufficiently model the cardiac CT angiography timing bolus, and to, therefore, include representations of the LCx, the LAD, the PDA, and the RCA. More specifically, referring to FIG. 5, arterial tubing 75 is positioned on a portion 77 of exterior surface 76 that approximates the position of the LCx in the typical human heart. Arterial tubing 75 then extends from portion 77, and runs towards aorta-representing member 74 until it reaches a portion 43 that represents an approximate position of the aortic root in the typical human heart. From this position, arterial tubing 75 loops oppositely away from aorta-representing member 74, and extends along exterior surface 76 to a portion 78 of exterior surface 76 that approximates the location of the LAD in the typical human heart. Arterial tubing 75 then runs from portion 78 to a posterior region 79 of exterior surface 76, wherein posterior region 79 models the approximate position of the heart apex in the typical human heart. From posterior region 79, arterial tubing 75 runs under posterior region 79 and then moves onto back side 191 towards aorta-representing member 74, where it extends up to a portion 80 of exterior surface 76 that approximates the location of the PDA in the typical human heart. Arterial tubing 75 then turns laterally from portion 80 towards proximal lateral side 192 of exterior surface 76, wraps back around to front side 190, and runs to a portion 81 of exterior surface 76 which approximates a location of the RCA in the typical human heart.

At the origin of the RCA, arterial tubing 75 extends through hollow interior 121 of member 74, and, therefore, extends upwards from exterior surface 76 to mimic the ascending aorta at a portion 87 thereof, and then arches downwards to mimic the descending aorta at a portion 88 thereof. Arterial tubing 75 terminates at a distal end 77 which is received by a catch basin 78. Arterial tubing 75 further comprises a proximal end 79 oppositely situated from distal end 77, wherein proximal end 79 is received by a contrast port 73 located on CT power injector 68 such that CT power injector 68 may feed a contrast agent through arterial tubing 75.

CAD mimicking members comprising calcium carbonate deposits 80 may be disposed at one or more points along an exterior surface of arterial tubing 75, wherein the calcium deposits may be detected via a calcium score which is conventionally used to test for calcified coronary atherosclerotic disease.

Airway subsystem 67 comprises a generally inverted Y-shaped body 82, wherein a vertically extending member 83 of body 82 represents the trachea, a member 84 which is joined to a terminal end 85 of member 83 and which represents the right bronchus, and a member 86 which is joined terminal end 85 of member 83 and which represents the left bronchus. Airway subsystem 67 may be identical to airway subsystem 15.

In an exemplary embodiment, phantom heart 66 is positioned relative to airway subsystem 67 such that body 71 is disposed between members 84 and 86, and such that member 86 is disposed between portions 87 and 88 of arterial tubing 75. Additionally, portion 117 of aorta-representing member 74 is preferably aligned with a portion of airway subsystem 67 that represents the tracheal carina.

Referring again to FIG. 4, EKG pulse generator 70 has two primary functions: (1) it generates electrical signals that mimic the electrical signals detected by an EKG machine when recording the electrical activity of the human heart; and (2) it controls the flow of fluid from fluid source subsystem 69 into body 71 via air port 72. To perform the first function, EKG pulse generator comprises an oscillator 97, a differentiator 98, a rectifier 99, and a voltage divider network 101.

Oscillator 97 is a square wave signal generator, such as a Schmitt Trigger square wave signal generator, which, more specifically, generates a signal which mimics a QRS signal generated by an EKG. In an exemplary embodiment, oscillator 97 generates a square wave that is about +6 volts to about +9 volts to about −6 volts to about −9 volts. Further, in an exemplary embodiment, oscillator 97 comprises a 741 operational amplifier, a 10 kiloohm variable resistor, a 3.3 kiloohm resistor, two 10 kiloohm resistors, and a 100 microfarad capacitor. The potentiometer allows adjustments in frequencies from about 20 to about 90 beats per minute, wherein such a range represents the human cardiac cycle.

Differentiator 98 detects changes in the square wave generated by oscillator 97, or the rising and falling edges of the square wave. In an exemplary embodiment, differentiator 98 comprises a 240 kiloohm resistor and a 0.1 microfarad capacitor with a time constant chosen so that 5 time constants are about 120 milliseconds, which is the approximate duration of a normal physiological QRS complex. Rectifier 99 comprises an operational amplifier and a half-wave rectifying diode, which eliminates the negative QRS impulses.

Voltage divider network 101 comprises a 0.1 microfarad capacitor, two 100 ohm resistors, a 39 kiloohm resistor, and an 82 kiloohm resistor, wherein the 39 and 82 kiloohm resistors decrease the signal voltage to about 20 millivolts which mimics the voltage typically found from a left arm and leg lead in an EKG test voltage. Voltage divider network 101 further comprises two 100 ohm resistors which halve the approximate 20 millivolts to about 10 millivolts to mimic the voltage of the right arm lead typically found in an EKG test. The voltage of the right leg lead is considered ground. Voltage divider network 101 further comprises a 0.1 microfarad capacitor which assists in attenuating the high frequency noise at the output of CT scanner 81.

The electrical outputs generated via voltage divider network 101 are transmitted to CT scanner 81 via leads 103, 105, 107, and 109, wherein lead 103 represents the left arm lead, lead 105 represents the left leg lead, lead 107 represents the right arm lead, and lead 109 represents the right leg lead. In an exemplary embodiment, EKG pulse generator 70 comprises a housing 111 which contains oscillator 97, differentiator 99, and voltage divider network 101. Additionally, housing 111 comprises four 8-32×½ inch Phillips machine screws with hex nuts to which leads 103, 105, 107, and 109 are physically attached to ensure sufficient electrical contact with CT scanner 81 input leads.

As previously mentioned, in addition to generating an electrical impulse that mimics the electrical impulse generated from EKG testing, training system 65 also mimics systole and diastole movements of the human heart. To that end, training system 65 comprises fluid source subsystem 69, which, in turn, comprises a tubing 90, a pneumatic control valve 91, a regulator 92, a fluid source 93, a tubing 94, a tubing 95, a pneumatic valve driver 96, a vacuum source 123, and a tubing 125. Tubing 90 connects air port 72 of heart phantom 66 to pneumatic control valve 91; while tubing 94 connects pneumatic control valve 91 to regulator 92; and tubing 95 connects regulator 92 to fluid source 93. In an exemplary embodiment the fluid comprises oxygen, and fluid source 93, therefore, may be an oxygen source, such as is typically installed in a CT scanning room. In an exemplary embodiment, fluid source 93 feeds compressed oxygen having a pressure reading of about 55 pounds per square inch ("psi") to regulator 92 via tubing 95. Regulator 92 reduces the pressure of the compressed oxygen from about 55 psi to about 10 psi so as to reduce the likelihood of harm to body 71 of phantom heart 66. In an exemplary embodiment regulator 92 comprises a Norgren regulator R73G-2AK-RSN Pressure Gauge (0-100 psi) MG-C3.

When pneumatic control valve 91 is in an "open" position, the compressed oxygen flows from tubing 94, through pneumatic control valve 91, through tubing 90, and then into the hollow interior of body 71 via air port 72, thereby expanding body 71.

Body 71 contracts by drawing the fluid out of body 71 via vacuum source 123, which may be one which is typically installed in a CT scanning room. Here, pneumatic control valve 91 may be "closed" such that the fluid is drawn from body 71, and through pneumatic control valve 91 and tubing 125. When pneumatic control valve 91 is "closed", no fluid from tubing 94 enters into tubing 90. Accordingly, in an exemplary embodiment, pneumatic control valve 91 is preferably a three-way valve, wherein such a valve comprises an E3V6 actuator, Additionally, in an exemplary embodiment, tubings 90, 91, 94, and 95 comprise an inner diameter of about 3 millimeters to about 4 millimeters, and may comprise oxygen tubing such as is conventionally known.

Pneumatic valve driver 96, which is in electrical connection with pneumatic control valve 91, controls the opening and closing of pneumatic control valve 91. To that end, pneumatic valve driver 96 comprises an operational amplifier and a diode, wherein an exemplary operational amplifier comprises a LM6171 amplifier manufactured by National Semiconductor, and an exemplary diode comprises an IN4001 diode manufactured by Fairchild Semiconductor. Oscillator 97 from EKG pulse generator 70 generates a square wave signal which is transmitted to the operational amplifier. Upon receiving the square wave signal generated by oscillator 97, the operational amplifier supplies sufficient current to allow pneumatic control valve 91 to open. In an exemplary embodiment, the LM6171 operational amplifier supplies 120 milliamps at 6 volts to open an EV36 pneumatic control valve. The diode of pneumatic valve driver 96 eliminates unwanted negative voltages from the square wave generated from oscillator 97 to thereby prevent pneumatic control valve 91 from opening during this phase.

In this manner, then, as oscillator 97 generates the QRS pulse for CT scanner 81 and controls pneumatic valve driver 96, the contractions of phantom heart 66 are synchronized with the electrical QRS signals.

An exemplary method of using training system 65 comprises connecting CT power injector 68 to proximal end 79 of arterial tubing 75, and placing distal end 77 of arterial tubing 75 into urinal catch basin so that the contrast agent outflow from arterial tubing 75 may be caught by catch basin 78. Regulator 92 may then be connected to air source 93. EKG pulse generator 70 may then be connected to CT scanner 81 such that leads 103, 105, 107, and 109 from EKG pulse generator 70 are fed into their respective receivers located on CT scanner 81. A scout topogram may then be performed in a conventional manner.

A calcium score may also be conducted via a conventional protocol. For example, a calcium score may be conducted about 1 centimeter below an area 51 (see FIG. 5), which models the placement of the tracheal carina, to just below the inferior border of phantom heart 66. CT scanner 81 may then take an image of a 3 millimeter slice thickness at about 120 kilovolts peak.

A timing bolus may be conducted with the contrast agent. Here, an axial slice may be taken through arterial tubing 75 at portion 87 (the portion which represents the ascending aorta). In an exemplary embodiment, the timing bolus includes 24 milliliters of Visipaque 350 at 6 milliliters per second with a 60 milliliter normal saline flush.

A cardiac CT angiography may also be performed. In an exemplary embodiment, about 120 milliliters of Visipaque 350 at about 6 milliliters per second with about 60 milliliter normal saline flush is introduced into arterial tubing 75 via CT power injector 68.

The calcium score images, cardiac CT angiography images, a 3D reformatted phantom heart image (also referred to as 3D volume rendering or 3DVR), and a dose length product radiation dose sheet may be sent to a picture archival system.

Figure 6:
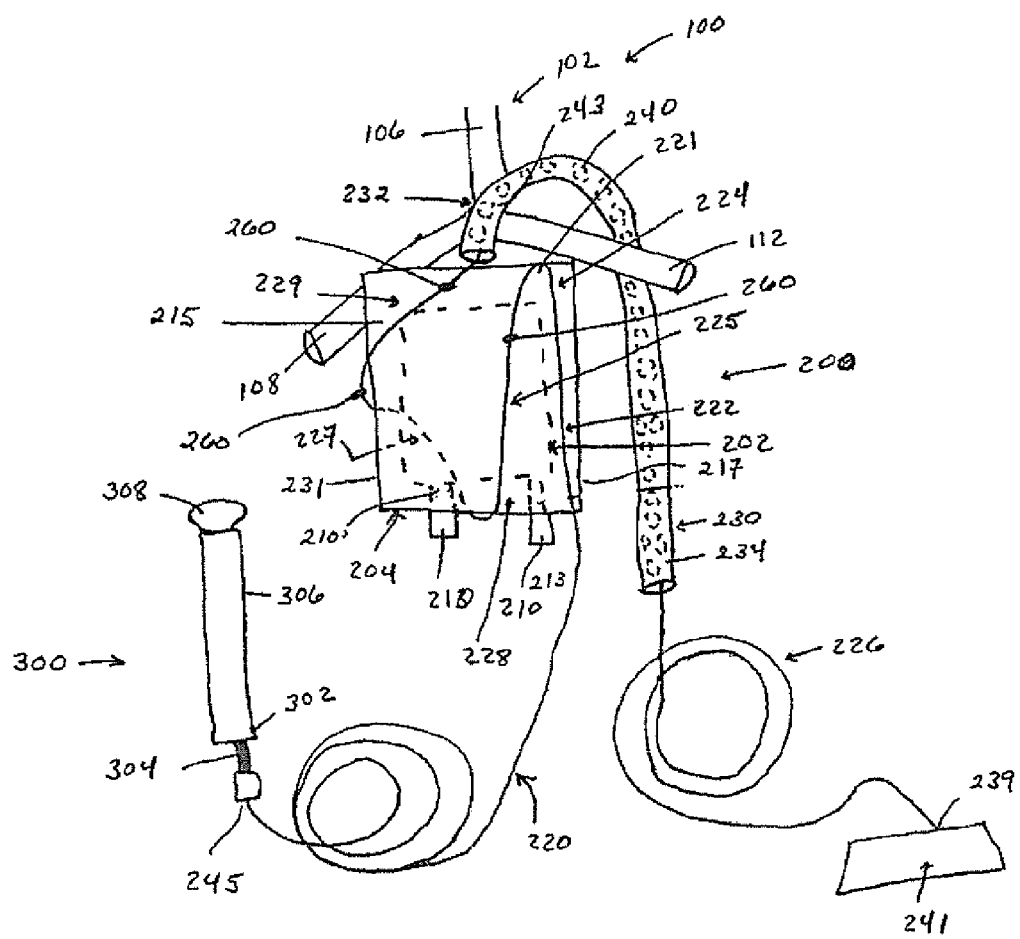
FIGS. 6 and 7 are schematics depicting another exemplary training system.
Figure 7:
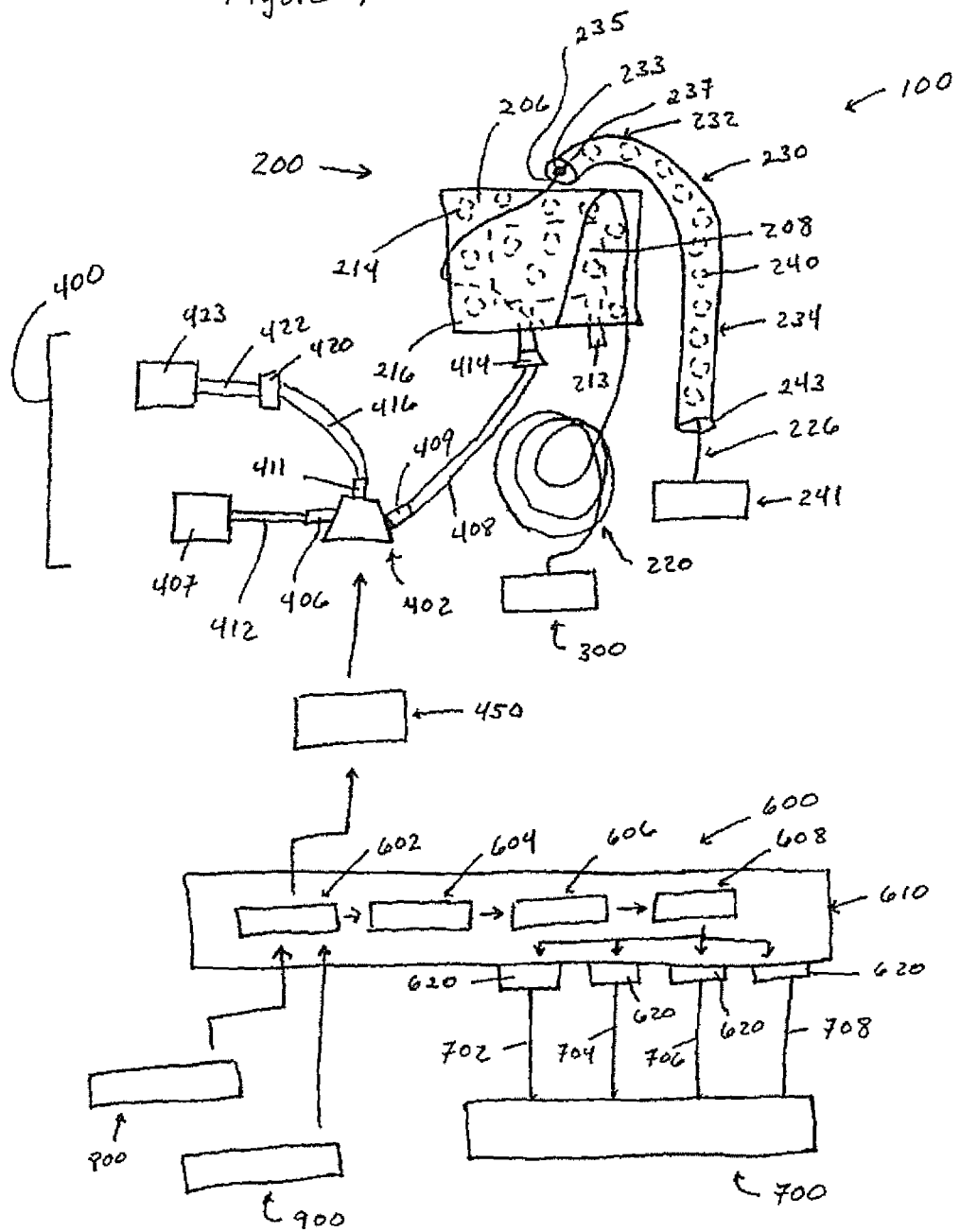
Figure 8:
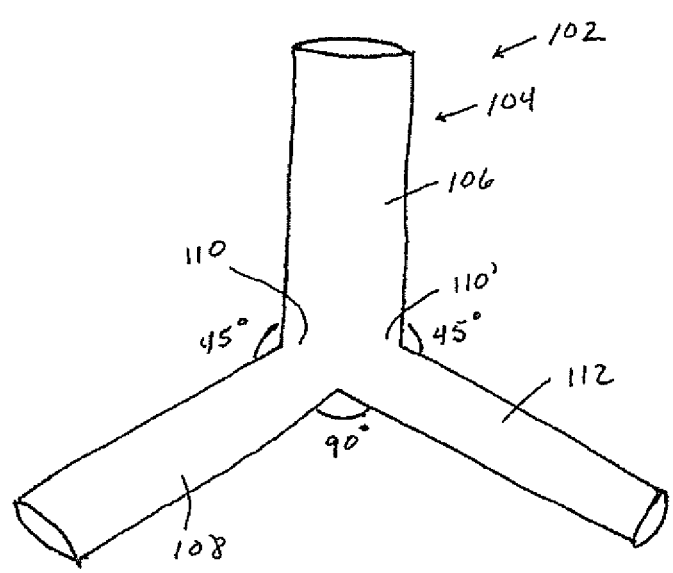
FIG. 8 is a schematic depicting an exemplary airway subsystem for the training system embodiments depicted in FIGS. 1-7.

Another exemplary training system is depicted in FIGS. 6 and 7. Here, a training system 100 comprises an airway subsystem 102. Airway subsystem 102 comprises a generally inverted Y-shaped body 104, wherein a vertically extending member 106 of body 104 represents a human trachea; a member 108, which extends from a proximal lateral terminal end 110 of body 104 at an angle of about 45 degrees therefrom, represents a human right bronchus; and a member 112, which extends from a distal lateral terminal end 110' of body 104 at an angle of about 45 degrees therefrom, represents a human left bronchus. Members 108 and 112 form an approximate angle of about 90 degrees relative to each other. Airway subsystem 102 may be identical to airway subsystems 15 and 67.

Training system 100 further comprises a phantom heart 200. Phantom heart 200 comprises an inner casing 202 enveloped by an outer casing 204 such that a chamber 206 is formed between inner casing 202 and outer casing 204. A chamber 208 is formed within inner casing 202. Outer casing 204 is selected and formed to model the epicardium, while inner casing 202 and chamber 208 are selected and formed to model the coronary left ventricle chamber. Each of inner casing 202 and outer casing 204 comprises an elastic material that is collapsible. Exemplary materials used to form casings 202 and 204 include, for example and without limitation, polyvinyl chloride, rubber, latex, and the like, wherein polyvinyl chloride is particularly preferred. In a particularly preferred embodiment, inner casing 202 comprises a conventionally formed 100 milliliter IV bag, and outer casing 204 comprises a conventionally formed 500 milliliter IV bag. Casings 202 and 204 each respectively comprises an air port 210 and 210', wherein air port 210 is in fluid communication with air port 210'. A check valve 213 is in fluid communication with inner casing 202, wherein check valve 213 assists in protecting the rupture of inner casing 202 when inner casing is filled with a fluid via a fluid source subsystem 400 as will be described below in further detail.

Phantom heart 200 further comprises a plurality of expansion members 214 disposed within chamber 206 and which represent the myocardium. In an especially preferred embodiment, expansion members 214 comprise a density substantially equivalent to that of human myocardium which is about 0 to about 20 Hounsfield Units. In an exemplary embodiment, expansion members are generally spherical-shaped objects, wherein an especially preferred expansion member comprises a spherical-shaped object having an outer diameter of about a 0.5 inch and which is formed of wood. Furthermore, the plurality preferably comprises a sufficient number of expansion members to allow for adequate expansion of inner casing 202.

Phantom heart 200 further comprises arterial tubing 220 which is disposed on an exterior surface 216 of outer casing 204. Arterial tubing 220 is dimensioned, configured, formed, and topologically positioned to model the LCx, the LAD, the PDA, and the right coronary artery in the human heart, and to replicate the timing for a cardiac CT angiogram timing bolus, thereby eliminating the need for distinct coronary arteries. In an exemplary embodiment, arterial tubing 220 comprises IV tubing, and has an inner diameter of about ⅛ inch, and an outer diameter of about ¼ inch.

An exemplary topological arrangement of arterial tubing 220 on exterior surface 216 includes placing arterial tubing 220 on a front side 215 and a back side 217 of exterior surface 216, wherein front side 215 is oppositely situated from back side 217. More particularly, and referring to FIG. 6, arterial tubing 220 is positioned on a portion 222 of exterior surface 216 of outer casing 204 that approximates the position of the LCx in the typical human heart. Arterial tubing 220 then extends from portion 222 and runs towards an anterior portion 224 of outer casing 204, wherein anterior portion 224 models an approximate position of the aortic root in the typical human heart. From this position, arterial tubing 220 loops oppositely away from anterior portion 224, and extends along exterior surface 216 to a portion 225 of exterior surface 216 that approximates the location of the LAD in the typical human heart. Arterial tubing 220 then runs from portion 225 to a posterior region 228 of exterior surface 216, wherein posterior region 228 models the approximate position of the heart apex in the typical human heart. From posterior region 228, arterial tubing 220 runs under posterior region 228 and then moves onto back side 217 towards the aortic root, where it extends up to a portion 227 of exterior surface 216 that approximates the location of the PDA in the typical human heart. Arterial tubing 220 then turns laterally from portion 227 towards a proximal lateral side 231 of exterior surface 216, wraps back around to front side 215, and runs to a portion 229 of exterior surface 216 which approximates a location of the RCA in the typical human heart.

Phantom heart 200 further comprises an aortic tubing 226 which is attached at a proximal terminal end 237 thereof to a distal terminal end 235 of arterial tubing 220 via a stepped connector 233. Aortic tubing 226 preferably comprises an inner diameter of about ⅜ inch, and may be formed from conventionally known IV tubing.

Phantom heart 200 further comprises a tubing 230 having a generally hook-like configuration. More particularly, tubing 230 comprises an ascending anterior portion 232 which extends upwardly away from outer casing 204 and towards airway subsystem 102. Ascending anterior portion 232 represents the ascending aorta. Ascending anterior portion 232 then bows to form a descending posterior portion 234 which extends towards and past posterior region 228 of outer casing 204. Descending posterior portion 234 represents the descending thoracic aorta. Tubing 230, which comprises a substantially cylindrical-configuration, comprises a hollow interior which receives IV tubing 226. In an exemplary embodiment, tubing 230 comprises a density substantially similar to that soft tissue, i.e., about 0 to about 20 Hounsfield Units. In a preferred embodiment, tubing 230 comprises polyethylene, polypropylene, cardboard, and the like.

Aortic tubing 226, which extends through ascending anterior portion 232 and descending posterior portion 234 of tubing 230, exits tubing 230 at a distal terminal end 243 thereof, and runs for approximately 16 inches therefrom until it terminates at a distal terminal end 239. Distal terminal end 239 is received by a catch basin 241, such as, e.g., a urinal. Catch basin 241 catches carrier agent outflow from aortic tubing 226.

Disposed between aortic tubing 226 and tubing 230 is a plurality of expansion members 240, which may be identical to expansion members 214. In an exemplary embodiment, plurality 240 comprises spherical, wooden balls having an inner diameter of about 0.5 inch, and further comprises about 25 to about 45 such balls, wherein about 30 to about 40 such balls is especially preferred.

At various points on at least one of arterial tubing 220 and aortic tubing 226, one or more CAD mimicking members 260, such as crushed calcium carbonate tablets, may be placed on an exterior surface thereof to mimic calcified coronary atherosclerotic disease.

Referring to FIG. 6, phantom heart 200 is positioned relative to airway subsystem 102 such that phantom heart 200 rests between right bronchi 108 and left bronchi 112. Further, left bronchi 112 is disposed between ascending anterior portion 232 and descending posterior portion 234 of aortic tubing 226. Additionally, ascending anterior portion 232 is aligned with a portion 243 of airway subsystem 102 that approximates the position of the tracheal carina.

Referring to FIGS. 6 and 7, training system 100 further comprises a CT power injector 300. CT power injector 300 is connected to an anterior terminal end 245 of arterial tubing 220, and pushes a contrast agent through arterial tubing 220 and aortic tubing 226.

In an exemplary embodiment, to mimic a normal timing bolus, about 3.2 meters of arterial tubing 220 is coiled and interposed between CT power injector 300 and outer casing 204, wherein such length represents about 400 milliliters of volume. This creates about a 7 second delay, as calculated from when CT power injector 300 initiates the injection of the contrast agent into arterial tubing 220 to when the contrast agent reaches anterior portion 232 of aortic tubing 226. This delay models the natural pulmonary arterial delay before a contrast agent reaches the aorta in an actual person.

CT power injector 300 comprises a head 302 which holds a syringe 304 which contains the contrast agent. CT power injector 300 further comprises a housing 306 which holds a plunger 308. Plunger 308 pushes the contrast agent out of syringe 304 and into arterial tubing 220. In an exemplary embodiment, syringe 304 is a 60 milliliter Luer lock syringe, and is connected to arterial tubing 220 via a Luer lock connector. CT power injector 300 is in communication with a computer control unit (not shown) which has pre-programmed therein, the flow rate, the volume, and the injection timing of the contrast agent. An exemplary CT power injector comprises one manufactured by Medrad Dual Power Injector.

Referring to FIG. 7, training system 100 further comprises fluid source subsystem 400. Fluid source subsystem 400 serves to provide a fluid, such as oxygen, to phantom heart 200, and to remove the fluid from phantom heart 200, thereby allowing for the respective expansion and contraction of phantom heart 200, and, more specifically, allowing for the expansion and contraction of inner casing 202 by the respective intake and removal of fluid into and from chamber 208, which in turn causes the expansion and contraction of outer casing 204 via the respective compression and decompression of expansion members 214 against the wall of outer casing 204.

Fluid source subsystem 400 comprises an electromechanical control valve 402, wherein an exemplary electromechanical control valve 402 includes an EVO-3-6-L valve such as is manufactured by Clippard Instrument Lab, Inc. Electromechanical control valve 402 comprises three hose barb connectors 406, 409, and 411 disposed thereon, wherein exemplary hose barb connectors include, for example, those having a ⅛ inch inner diameter such as those manufactured by Clippard Instrument Lab, Inc. as part CT4.

Subsystem 400 further comprises a tubing 408 which is attached to connector 409 of valve 402 at one end thereof and to air port 210' of inner casing 202 at an opposite end thereof via a connector 414, such as, e.g., a Christmas tree connector. Subsystem 400 further comprises a tubing 412 which is attached to connector 406 of electromechanical control valve 402 and to a fluid source 407. An exemplary fluid source 407 comprises an oxygen source such as is conventionally found in a CT scan room. In an exemplary embodiment, tubings 408 and 412 each comprise an inner diameter of about ⅛ inch, and an outer diameter of about ¼ inch.

Subsystem 400 also comprises a tubing 416 which is connected to connector 411 and to a connector 420, which may include, for example, a Christmas tree connector. In an exemplary embodiment, tubing 416 comprises an inner diameter of about ⅛ inch and an outer diameter of about ¼ inch. A tubing 422 is connected to a vacuum source 423 at one end thereof and to connector 420 at an oppositely situated end thereof. In an exemplary embodiment, tubing 422 comprises an inner diameter of about 3/16, inch and a length of about 12 feet, wherein an exemplary manufacturer of such tubing is Medivac. An exemplary vacuum source may be one as is typically found in a CT scan room, wherein an exemplary vacuum comprises a pressure of about 300 millimeters of mercury.

Fluid source subsystem 400 allows phantom heart 200 to respectively expand and contract in a manner similar to the expansion and contraction of an actual human heart, and, thereby mimics systolic and diastolic movement. More particularly, through the control of electromechanical control valve 402, a fluid is either allowed to flow through tubing 412 and tubing 408, and into inner casing 202, thereby causing the expansion of the walls of inner casing 202, or to flow from inner casing 202 and into tubing 416 and then into tubing 422, thereby causing the contraction of inner casing 202. The expansion of inner casing 202 pushes expansion members 214 against the walls of outer casing 204, thereby causing outer casing to expand; while the contraction of inner casing 202 relaxes the directional force applied to expansion members 214, thereby causing the contraction of outer casing 204. This combined movement of inner casing 202 and outer casing 204 mimics epicardial coronary artery movement during an actual average human cardiac cycle. In an exemplary embodiment, compressed oxygen having a pressure of about 100 pounds per square inch is introduced into tubing 408 via electromechanical control valve 402.

The opening and closing of ports in fluid communication with connectors 406, 409, and 411 of electromechanical control valve 402 are controlled by a pneumatic valve driver 450, which in turn is controlled by an oscillator 602 from an EKG pulse generator 600, wherein pneumatic valve driver 450 and EKG pulse generator 600 are integral components of training system 100.

In an exemplary embodiment, EKG pulse generator 600 comprises an oscillator 602, a differentiator 604, a rectifier 606, and a voltage divider network 608. Oscillator 602 controls pneumatic valve driver 450, and also assists in generating the EKG signal which is transmitted to a CT scanner 700, such as a 64 slice CT scanner, for purposes of synchronizing the inflation and deflation of phantom heart 200 with particular electrical outputs created by EKG pulse generator 600. To that end, oscillator 602 comprises a 555 timing chip which generates a digital 5 volt square wave at about 5 hertz to about 20 hertz. Oscillator 602 further comprises a variable 100 kiloohm resistor in series with a 1 kiloohm resistor, wherein the resistors allow for adjustment of the frequency. Oscillator 602 also comprise a decade counter which divides the frequency by a factor of about 10, i.e., to about 0.5 hertz to about 2 hertz, wherein such a frequency equates to about 30 beats per minute to about 120 beats per minute.

The decade counter allows for about 10 separate phases per beat. The first phase of each beat generated by the decade counter is processed through differentiator 604, rectifier 606, and voltage divider network 608 to generate an R to R wave. As will be discussed below, the fourth phase of each beat corresponds to the beginning of mechanical diastole and the insufflations of phantom heart 200; while the seventh phase of each beat corresponds to the end of mechanical diastole. Described in another way, the 40 percent phase corresponds to a maximum mechanical systole (the beginning of diastole), while the 70 percent phase corresponds to a maximum mechanical diastole (the beginning of systole).

In an exemplary embodiment, differentiator 604 is a high pass filter and comprises about a 1 microFarad capacitor and about a 56 kiloohm resistor with about a 741 operational amplifier buffer. The differentiator is selected to obtain the slope of the incoming square wave, hence, the rising and falling edge of the square wave produces a positive and negative impulse which models a QRS signal. The rising and falling edges correspond to high frequencies which the capacitor allows to pass. Other signals are blocked by the capacitor and filter to ground through the resistor.

Rectifier 606 comprises a half wave rectifying diode that eliminates the negative voltage R impulses created from the high pass filter of differentiator 604. Voltage divider network 608 decreases the signal voltage from about 5 volts to about 40 millivolts, which mimics the EKG voltage at the left arm and left leg of a typical person. Voltage divider network 608 further comprises two 470 ohm resistors which halve the voltage to about 20 millivolts to mimic the EKG voltage at the right arm of the typical person. The voltage of the right leg limb lead is considered ground.

The electrical outputs generated via voltage divider network 101 are transmitted to CT scanner 700 via leads 702, 704, 706, and 708, wherein lead 702 represents the left arm lead, lead 704 represents the left leg lead, lead 706 represents the right arm lead, and lead 708 represents the right leg lead. In an exemplary embodiment, EKG pulse generator 600 comprises a housing 610 which contains oscillator 602, differentiator 604, rectifier 606, and voltage divider network 608. Additionally, housing 610 comprises four 8-32×½ inch Phillips machine screws with hex nuts 620 to which leads 702, 704, 706, and 708 are physically attached to ensure sufficient electrical contact with CT scanner 700 input leads.

As previously stated, oscillator 602 controls pneumatic valve driver 450. In an exemplary embodiment, to simulate the bundle of His, there is preferably about a 40 percent delay between an R wave generated by EKG pulse generator 600 and the subsequent signal to pneumatic valve driver 450 from oscillator 602. Accordingly, pneumatic valve driver 450 comprises an OR gate, such as a 74LS86 exclusive OR gate, such as is manufactured by Fairchild Semiconductor which combines the fourth to seventh phases generated by the decade counter of oscillator 602, i.e., the phases of a beat that represent maximum systole and maximum diastole. The resulting signal is sent to two or more analog amplifiers of pneumatic valve driver 450, wherein exemplary amplifiers include a 741 non-inverting analog amplifier, such as is manufactured by Texas Instruments and National Semiconductor, and a LM6171 analog operational amplifier, such as is manufactured by National Semiconductor. The first amplifier increases the voltage of the signal generated by the OR gate, wherein in an exemplary embodiment, the first amplifier increases the voltage from about 5 volts to about 9 volts. The second amplifier increases the voltage further to supply sufficient current to open electromechanical control valve 402, wherein, in an exemplary embodiment, electromechanical control valve 402 requires about 120 milliamps at greater than about 6 volts to open.

Subsystem 400 may further comprise an ectopic heartbeat-generating oscillator 800, wherein oscillator 800 assists in creating an ectopic heartbeat that mimics an ectopic heartbeat of premature atrial contraction or supraventricular tachycardia ("SVT"). In an exemplary embodiment, oscillator 800 comprises a 555 timing chip. A variable resistor allows adjustment of the frequency from about 10 beats per minute to about 20 beats per minute. A switch turns the ectopic beat function "on" or "off". When the ectopic beat function is "on", the decade counter from oscillator 602 resets to the first phase whenever it receives a signal from oscillator 800 regardless of the cardiac cycle. A variable resistor allows adjustment of the frequency from about 10 beats per minute to about 20 beats per minute. This models a premature atrial contraction or a supraventricular propagated beat. Additionally, an inverter, such as one built from a NAND gate, may be used to reset the decade counter.

Subsystem 400 may further comprise an atrial fibrillation-generating oscillator 900 which assists in generating signals that model atrial fibrillation. In an exemplary embodiment, oscillator 900 uses up to about 5 decade counters to generate a repeating 5 beat run of atrial fibrillation with variable diastolic delay appropriate to the length of the variable beat. In an exemplary embodiment, millivolt waveform (the upper wave) represents the EKG R wave signal, while a 6 volt waveform (the lower wave) represents the electrical signal sent to electromechanical control valve 402. A high signal opens electromechanical control valve 402, thereby allowing oxygen to flow into inner casing 202 of phantom heart 200. This, therefore, represents diastole. The remainder of the time the lower waveform is 0 volts, which results in a closing of electromechanical control valve 402, thereby allowing vacuum source 407 to remove oxygen from inner casing 202, and which thereby represents systole.

An exemplary method of use for training system 100 comprises connecting power injector 300 to arterial tubing 220, and placing distal terminal end 239 of aortic tubing 226 in catch basin 241. Tubing 422 and 416 may be connected to vacuum source 423 and to valve 402, while tubing 412 is attached to fluid source 407 and to valve 402. Tubing 408 may be connected to valve 402 and to air port 210'. EKG pulse generator 600 may be connected to CT scanner 700 such that leads 702, 704, 706, and 708 are attached to their respective inputs located on CT scanner 700. Scout topograms may then be performed via conventionally known means. A calcium score may be performed in which a scan is taken about 1 centimeter below the tracheal carina to just below the inferior border of phantom heart 200.

Additionally, a timing bolus with a contrast agent may also be performed via conventionally known means. In a preferred embodiment, 24 milliliters of Visipaque 350 at 6 milliliters per second with 60 milliliters normal saline flush may be used for timing the bolus. An axial slice through anterior portion 232 of aortic tubing 226 then may be. A cardiac CT angiography may then be conducted using 120 milliliters Visipaque 350 at 6 milliliters per second with 60 milliliters normal saline flush. Calcium score images, cardiac CT angiography images, including 3D reformatted phantom heart image, and dose length product radiation dose sheet may be sent to a picture archival system.

As apparent from the above disclosure, the training system of the present invention is an anatomic, electrical and mechanical model for cardiac CT angiography to train CT technologists. The model mimics calcium scoring, timing bolus, and cardiac CT angiography with cardiac motion. The phantom allows technologists to practice before imaging patients. This reduces the need for repeat or additional studies from poorly performed exams, thereby reducing the radiation and IV contrast dose to patients.

As previously stated, the above-described embodiments, are exemplary only, and are in no way intended to limit the scope of the invention. Other variants of the invention will be readily apparent to one of ordinary skill in the art and are encompassed by the appended claims. Additionally, although the disclosure specifically teaches the use of the training system for performing CT angiography on humans, the training system is not intended to be so limited. Rather, the training system may be modified to include phantom hearts and airway subsystems which model the orientation and configuration of other animals as well.

It is further noted that the training system may also include a radiation detector, such as a dosimeter, so that the dose of radiation received by the simulated patient during a CT angiography may be determined.

In yet other embodiments, the training system optionally includes elements that mimic pathologies of cardiac disease or the treatment thereof. For example, such elements could mimic various locations and other parameters of plaques or stents.

What is claimed is:

1. A training system comprising:
   a phantom heart comprising:
      an expandable inner casing having a first chamber formed therein;
      an expandable outer casing having an exterior surface opposite to an interior surface, wherein the interior surface surrounds the inner casing to form a second chamber, and wherein the exterior surface has an anterior portion oppositely situated to a posterior portion;
      an arterial tubing having a proximal end oppositely situated to a distal end, and further comprising a distal left circumflex artery, a left anterior descending artery, a posterior descending artery, and a right coronary artery, wherein the distal left circumflex artery, the left anterior descending artery, the posterior descending artery, and the right coronary artery are disposed over the exterior surface of the outer casing;
      a plurality of expansion members disposed within the second chamber, wherein the plurality of expansion members comprises spherical-shaped objects, and further wherein the expansion of the inner casing compresses the expansion members against the exterior surface of the outer casing thereby causing the outer casing to expand, and wherein the contraction of the inner casing decompresses the expansion members thereby causing the outer casing to contract;
      an ascending aorta and a descending thoracic aorta, wherein each of the ascending aorta and the descending thoracic aorta have a hollow interior wherein the hollow interiors are in fluid communication with one another; and
      an aortic tubing, wherein the aortic tubing is joined to the arterial tubing and further wherein the aortic tubing is disposed within the hollow interiors of the ascending aorta and the descending thoracic aorta, and further wherein the aortic tubing receives the contrast agent outflow from the arterial tubing;
   a cardio atherosclerotic disease mimicking member which is disposed on an exterior surface of the arterial tubing, wherein the cardio atherosclerotic disease mimicking member comprises calcium carbonate:
   a power injector which is in fluid communication with the arterial tubing of the phantom heart, and which supplies a contrast agent into the arterial tubing;
   a fluid source subsystem comprising:
      a fluid source; and
      a vacuum source;
   wherein the fluid source supplies a fluid into the first chamber, thereby causing the inner casing to expand, and the vacuum source removes the fluid from the first chamber, thereby causing the inner casing to contract;
   an electrocardiogram pulse generator, wherein the electrocardiogram pulse generator produces an electrical signal that mimics an electrical signal obtained from an electrocardiogram test; and
   a computed tomography scanner, wherein the computed tomography scanner is in electrical communication with the electrocardiogram pulse generator, and further wherein the computed tomography scanner performs a coronary computed tomography angiography on the phantom heart once the contrast agent is supplied into the arterial tubing by the power injector.

2. The training system of claim 1, further comprising an airway subsystem, wherein the airway subsystem comprises:
   a vertically extending trachea which comprises a proximal lateral terminal side opposite to a distal lateral terminal side;
   a right bronchus which extends at an approximately 45 degree angle from the proximal lateral terminal side; and
   a left bronchus which extends at an approximately 45 degree angle from the distal lateral terminal side;
wherein the vertically extending member, the first member, and the second member of the airway subsystem join at a tracheal carina portion, and further wherein the anterior portion of the phantom heart is directed towards the trachea.

3. The training system of claim 1, wherein the plurality of expansion members is further disposed within the hollow interiors of the ascending aorta and the descending thoracic aorta.

4. The training system of claim 1, wherein the fluid source subsystem further comprises a valve driver in electrical communication with the control valve, wherein the valve driver generates power to close and open a port on the control valve through which the fluid flows from the fluid source to enter the first chamber.

5. The training system of claim 4, wherein the electrocardiogram pulse generator comprises an oscillator, wherein the oscillator creates a square wave which is used to produce the electrical signal that mimics the electrical signal obtained from the electrocardiogram test, and further wherein the oscillator is in electrical communication with the valve driver, and further wherein the oscillator generates an electrical signal which powers the valve driver.

6. The training system of claim 1, wherein the fluid comprises oxygen.

7. The training system of claim 1, wherein the plurality of expansion members comprises spherical shaped balls.

* * * * *